United States Patent [19]

Beacon

[11] 3,850,269

[45] Nov. 26, 1974

[54] SLACK ADJUSTER

[75] Inventor: Robert G. Beacon, Sparta, N.J.

[73] Assignee: Ellcon-National, Inc., Totowa, N.J.

[22] Filed: June 18, 1973

[21] Appl. No.: 371,031

[52] U.S. Cl. .............................. 188/202, 188/196 D
[51] Int. Cl. ........................................... F16d 65/66
[58] Field of Search .. 188/196 BA, 196 D, 198–203

[56] References Cited
UNITED STATES PATENTS

| 3,096,859 | 7/1963 | Showers et al. | 188/196 D |
| 3,283,861 | 11/1966 | Mersereau | 188/196 D |
| 3,593,827 | 7/1971 | Sander | 188/196 D |

Primary Examiner—Duane A. Reger
Attorney, Agent, or Firm—Brooks, Haidt & Haffner

[57] ABSTRACT

A slack adjuster for adjusting railway car brake rigging slack which adjuster comprises a threaded pull rod longitudinally movable with respect to a housing, an internally threaded adjusting nut encircling the rod and rotatable with respect to the housing but limited in longitudinal movement with respect thereto, the nut having peripheral ratchet teeth and a conical end surface, a pair of oppositely acting pawls on the housing and engageable with said ratchet teeth and a cam bar operable in accordance with the movement of the rigging for engaging said pawls with and disengaging said pawls from the ratchet teeth as the car brakes are applied and released, the housing having a conical surface engageable with the conical surface on said nut when the pawl which engages the ratchet teeth upon application of the brakes so engages the ratchet teeth, the engaged conical surfaces aiding said pawl in preventing rotation of the adjusting nut.

10 Claims, 8 Drawing Figures

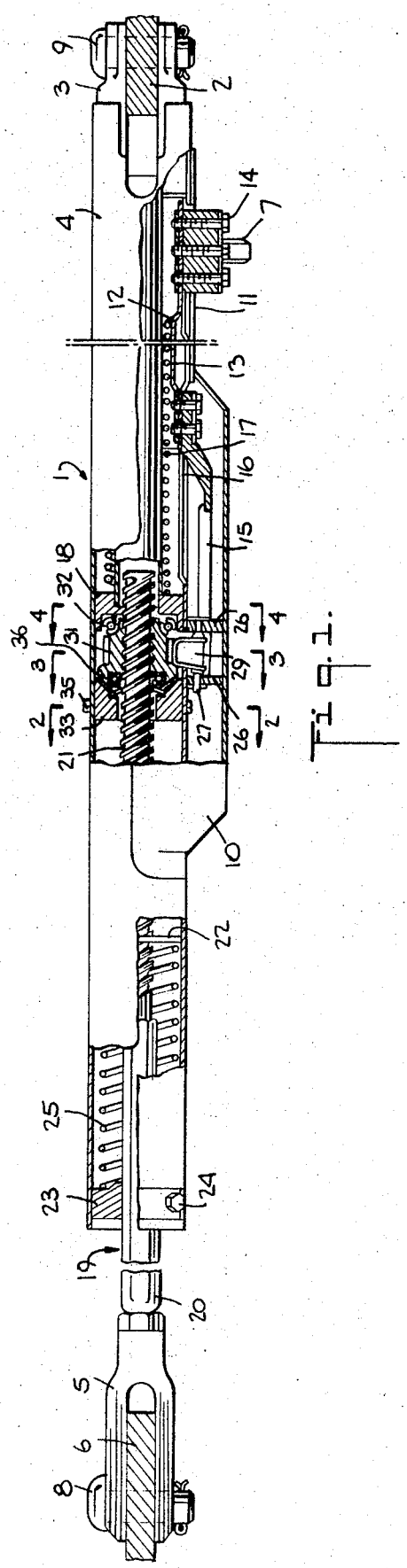
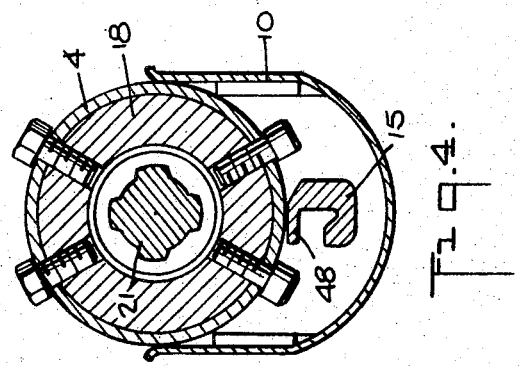
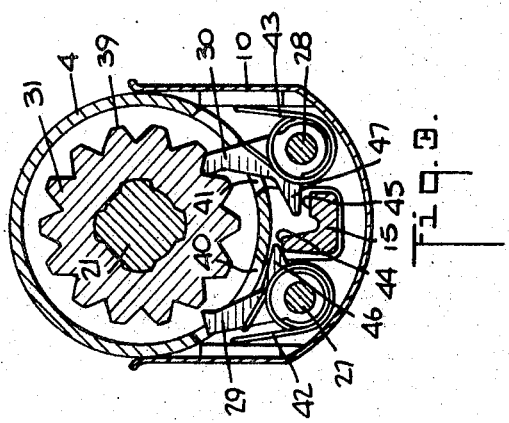
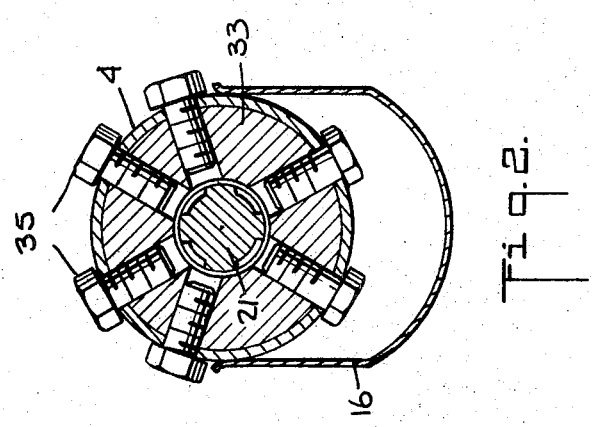

SLACK ADJUSTER

This invention relates to automatic slack adjusters for the brake rigging of railway cars and like vehicles. More particularly, the invention relates to automatic slack adjusters of the kind which are used with apparatus in which brake shoes are operated by a fluid actuated cylinder and piston arrangement through brake rigging, including live levers, dead or fulcrum levers and connecting rods.

The present invention relates to improvements in the slack adjuster for power transmission systems described in the U.S. Pat. No. 3,283,861 and provides a number of advantages over the slack adjuster disclosed in said patent.

In the slack adjuster described in said Pat. No. 3,283,861, a pull rod assembly which is connected to one part of the brake rigging is movable longitudinally with respect to a housing which is connected to another part of the brake rigging. The pull rod assembly has a threaded portion which is surrounded by a threaded adjusting nut having peripheral ratchet teeth and rotatably mounted on the housing. A pair of pawls, actuatable by a cam bar, are engageable with said ratchet teeth, and when one pawl engages said teeth, rotation of said nut in one direction is prevented whereas when the other pawl engages said teeth, rotation of the nut in the other direction is prevented. When the nut is free to rotate, the force applied thereto by said threaded portion causes the nut to rotate and permits the pull rod assembly to move longitudinally with respect to the housing. The cam bar is actuated by an activating lever or stop separate from the slack adjuster dependent upon the movement of the brake rigging, and therefore, the movement of the cam bar depends upon the movement of the brake rigging during actuation and release of the brakes.

During the last stages of the application of the brakes, the cam bar permits one of the pawls, called the load pawl, to engage the ratchet teeth on the adjusting nut and thereby to stop rotation of the nut and substantially prevent longitudinal, lengthening movement of the pull rod assembly with respect to the housing. However, at this stage, the housing and pull rod assembly are subjected to relatively large forces tending to move the housing and assembly relative to each other. Under normal and usual conditions, the load pawl adequately restrains the adjusting nut so that the housing and assembly do not separate. However, under some abnormal conditions, such as when excessive brake line air pressure is used and excessive brake pressures are applied, or when, after extended use, wear occurs in the ratchet teeth or the load pawl, the load pawl may not securely engage or hold the adjusting nut with excessive braking forces, permitting undesired relative movement between the housing and the pull rod assembly.

One object of the invention is to provide an improved slack adjusting device of the type described in said Pat. No. 3,283,861 and which prevents said undesired relative movement between said housing and said pull rod assembly under said abnormal conditions.

A further object of the invention is to provide a slack adjusting device able to withstand greater braking forces and thereby, to provide a greater margin of safety in the use thereof.

Another object of the invention is to add to the control of the adjusting nut of said slack adjuster so as to provide backup controls therefor which are effective under said abnormal conditions.

The above-mentioned and other objects of the invention are attained by the provision, in a slack adjuster of the hereinbefore described type, of a friction braking device which normally is inoperative but which, when the load pawl stops the adjusting movement of the adjusting member, e.g., the adjusting nut, prevents, or assists in preventing, further adjusting movement of the adjusting member. In this way, the parts of the adjuster will perform their normal functions, but when the braking force applied to the brake rigging exceeds a predetermined limit, the braking device becomes effective to prevent further adjusting movement of the adjusting member, thereby subjecting the adjusting member to both the restraining force of the load pawl and the restraining force of the braking device. Also, with the use of such braking device, the load pawl need not be subjected to forces as large as those to which it is subjected in the absence of the braking device.

In the preferred embodiment of the invention, the braking device comprises a truncated conical surface of the adjusting nut and a mating truncated conical surface on the housing or a part affixed thereto. The surfaces are normally maintained apart by spring means and are disposed with respect to each other so that they are pulled against each other when the adjusting nut is engaged by the load pawl by reason of the oppositely directed forces applied to the housing and the pull rod assembly by the car brake rigging. The engagement of such surfaces with each other applies a friction braking force to the adjusting nut which increases with an increase in the car brake rigging forces. Preferably, the braking force applied to the adjusting nut by such surfaces is at least sufficient to prevent further rotation of the adjusting nut even if the load pawl were thereafter disengaged from the adjusting nut, but such braking force may be less, such as 50% of the force required to prevent rotation of the adjusting nut with normal car brake rigging forces and with the load pawl disengaged. Thus, the braking device is to be distinguished from a mere abutment engageable with an end of the adjusting nut to prevent longitudinal movement thereof, but which exerts substantially no force on the nut which prevents rotation thereof.

Other features, objects and advantages of the invention will be apparent from the following description of a presently preferred embodiment of the invention, which description should be considered in conjunction with the accompanying drawings, in which:

FIG. 1 is a side elevation view, partially in section, of a slack adjusting device constructed in accordance with the concept of this invention;

FIG. 2 is a transverse sectional view of the embodiment in FIG. 1 and is taken along the line 2—2 in FIG. 1;

FIG. 3 is a transverse sectional view of the embodiment in FIG. 1 and is taken along the line 3—3 in FIG. 1;

FIG. 4 is a transverse sectional view of the embodiment in FIG. 1 and is taken along the line 4—4 in FIG. 1;

Figure 5:
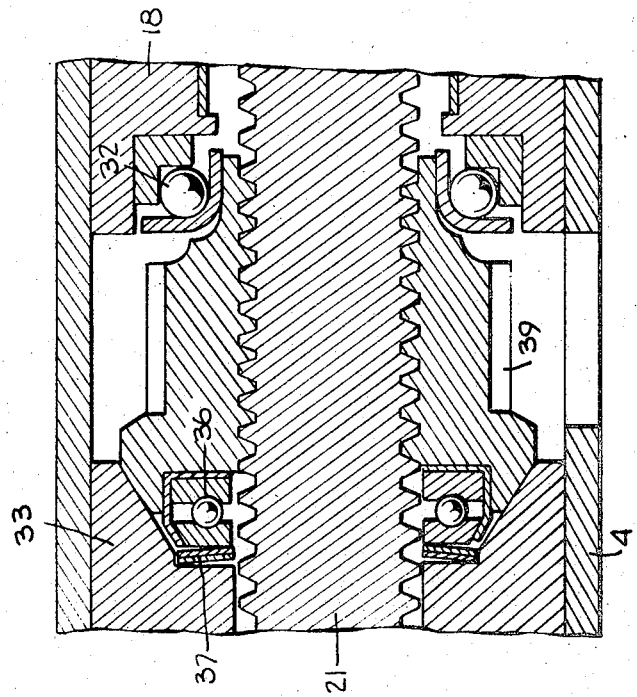
Figure 7:
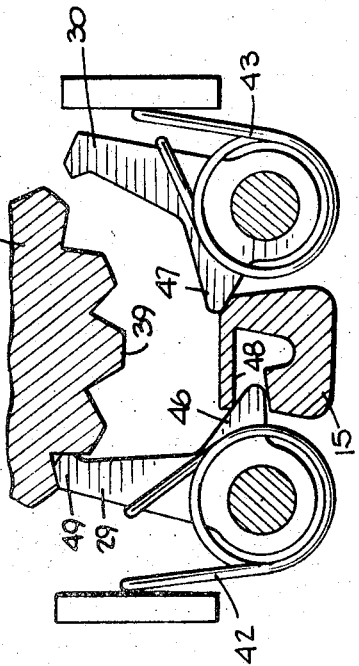
Figure 6:
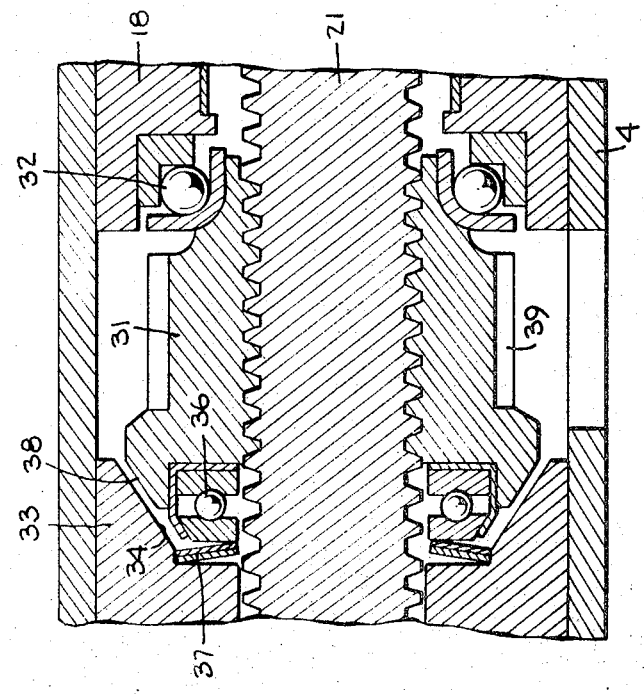
Figure 8:
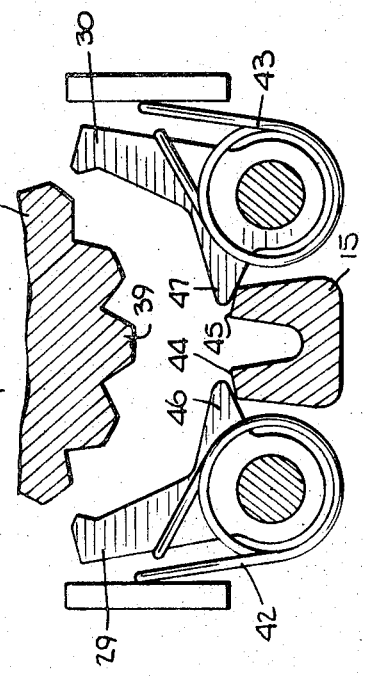

FIGS. 5 and 6 are enlarged, fragmentary, longitudinal, sectional views respectively illustrating the positions of the adjusting nut in the car brakes released and applied conditions; and FIGS. 7 and 8 are enlarged, fragmentary, transverse, sectional views respectively illustrating the load pawl and holding pawl positions at intermediate and ultimate positions of the cam bar which operates such pawls.

The slack adjusting device 1 illustrated in FIG. 1 may be used in connection with a typical brake rigging currently employed in railway rolling stock in the manner described in said Pat. No. 3,283,861 and is shown pivotally connected to a live lever 2 by means of the slotted end 3 of the housing 4. The other end of the device 1 is pivotally connected by the clevis 5 of the pull rod assembly hereinafter described to a fulcrum lever 6. The levers 2 and 6 form part of the car brake rigging as described in said patent.

As shown in FIG. 1, an activating arm or trigger 7 extends downwardly from the slack adjusting device 1 but the arm 7 may extend therefrom in a different direction. Shortly after the brakes are first applied, the activating arm 7 is moved, such as by the actuating lever described in said patent, and operates the mechanism of the slack adjusting device 1 in such a manner as to reduce the overall length of the adjusting device 1 when there is slack in the brake rigging. Thus, when there is excess slack in the brake rigging the distance between the pivot point 8 and the pivot point 9 decreases during application of the brakes.

A pawl cover 10 is fixedly attached to the tubular housing 4, and the housing 4 is provided with a slot 11 to allow for movement of the activating arm 7 which is connected to an actuator 13 as by means of screws 14. The actuator 13 is slidably mounted within the housing 4 and is provided with an internal ridge 12. The actuator 13 is connected to a cam bar 15, and the housing 4 is provided with a slot 16 to allow for movement of the cam bar 15. A coil compression spring 17 is mounted within the housing 4 and acts between the ridge 12 and a bearing retainer 18 secured to the housing 4 to urge the actuator 13 to the right as viewed in FIG. 1.

A pull rod assembly, designated generally by the reference numeral 19, comprises, in addition to the clevis 5, a pull rod portion 20, having a non-circular section, and a threaded portion 21. A collar 22 is secured to the portion 21 and is slidable in the housing 4. A spring retainer 23 is fixedly connected to the inside of the tubular housing 4, such as by means of cap screws 24. A coil compression spring 25 is contained between the collar 22 and the spring retainer 23 and urges the pull rod assembly 19 to the right as viewed in FIG. 1. The retainer 23 is provided with an opening for receiving the pull rod portion 20 which opening has a non-circular shape matching that of the portion 20 to prevent rotation of the pull rod assembly 19 with respect to the housing 4.

A pair of abutments 26 are fixedly attached to the housing 4 for supporting pivot axles 27 and 28 (see FIGS. 1 and 3). A load pawl 29 is supported by the axle 27 and a holding pawl 30 is supported by the axle 28. Preferably, the threaded portion 21 is provided with a thread having a lead per revolution of approximately the same amount as the diameter of the bar, but this lead can be considerably more or less than this amount. An adjusting nut 31, having a bore with threads the same as the threads described hereinbefore in connection with the threaded portion 21 of the pull rod assembly 19, is loosely fitted over the threaded portion 21.

A low friction, thrust and radial ball bearing 32 is mounted between one end of the nut 31 and the retainer 18, and a sleeve 33 having an inner surface 34 (see FIG. 5) in the shape of a truncated cone, is mounted inside the tubular housing 4 and attached thereto by suitable means, such as cap screws 35. A thrust, ball bearing 36 and Belleville spring washers 37 are mounted between the opposite end of the nut 31 and the sleeve 33. Such opposite end of the nut 31 has a surface 38 (FIG. 5) in the shape of a truncated cone and mates with the surface 34 when the nut 31 is moved to the left as viewed in FIG. 1 by the pull rod assembly 19. The spring washers 37 maintain the surfaces 34 and 38 apart until the force of the washers 37 is overcome by the forces applied to separate the housing 4 and the pull rod assembly 19, and it will be apparent, from the description given hereinafter, that the torque tending to rotate the nut 31 before the surface 38 engages the surface 34, and hence, the force applied to the load pawl 29 before such surfaces engage, is dependent upon the force of the washers 37 tending to separate the surfaces 34 and 38. Accordingly, such torque, and the maximum force applied to the pawl 29 before the surfaces 34 and 38 engage, is adjustable by adjusting the resistance of the washers 37 to compression.

The center portion of the periphery of the adjusting nut 31 has ratchet teeth 39, which are engageable with the pawls 29 and 30, a slot 40 (FIG. 3) extending through the housing 4 for the pawl 29 and a slot 41 extending through the housing 4 for the pawl 30. Referring to FIG. 3, the load pawl 29 is urged toward engagement with the teeth 39 of the adjusting nut 31 by means of a spring 42, and the holding pawl 30 is urged into engagement with the teeth 39 of the adjusting nut 31 by means of a spring 43. The function of the holding pawl 30 is to prevent clockwise rotation of the nut 31, as viewed in FIG. 3, when the car brakes are in their released position.

Referring to FIGS. 3, 4, 7 and 8, the cam bar 15 is provided with cam surfaces 44 and 45 with heights which vary lengthwise of the cam bar 15, the cam surface 44 being adapted to engage the lug 46 of the load pawl 29 and the cam surface 45 being adapted to engage the lug 47 of the holding pawl 30 for purposes of actuating the pawls 29 and 30 respectively. Although not preferred, the cam bar 15 may, if desired, also have a cam surface 48 (FIGS. 4 and 8) engageable with the lug 46 when the car brakes are nearly fully applied so as to completely nest the end 49 (FIG. 8) between the teeth 39. Thus, even if the end 49 is not completely nested by the spring 42, the surface 48 can be used to further assure complete nesting of the end 49 between the teeth 39, but such surface 48 is unnecessary and may be omitted.

In operation, when the car brakes are released, that is, when the brake air piston and the brake rigging are in their release positions, the parts of the slack adjusting device 1 will be in the positions shown in FIGS. 1, 3 and 5, and the load pawl will be in its disengaged position (FIG. 3) and the holding pawl 30 will be in its engaged position illustrated in FIG. 3. As the brakes are applied, the lever 2 will move to the right, as viewed in FIG. 1, and at some point in the movement, the activating arm 7 will be moved to the left, as viewed in FIG. 1, with respect to the tubular housing 4, thereby compressing the spring 17 and causing the actuator 13 to move to the left with respect to the housing 4. At an intermediate stage in the application of the brakes, the actuator 13 will have moved the cam bar 15 to the left, as viewed in FIG. 1, to a position wherein both the cam surfaces 44 and 45 will engage the lugs 46 and 47 of the pawls 29 and 30, respectively, and thereby lift the pawls 29 and 30 out of engagement with the teeth 39 of the adjusting nut 31 as shown in FIG. 7. At this time, namely, when both of the pawls 29 and 30 are disengaged from the adjusting nut teeth 39, the nut 31 is free to rotate and if there is slack in the brake riggings, the pull rod assembly 19 will move to the right with respect to the housing 4 under the pressure of a spring 25, thereby shortening the overall length of the slack adjusting device 1 to take up the slack in the rigging. When the brakes are still further applied, the actuator 13 moves the cam bar 15 further to the left because of the pressure exerted against the activating arm 7 by the activator therefor. In this position of the cam bar 15, the cam surface 45 will maintain the holding pawl 30 out of engagement with the teeth 39 of the adjusting nut 31 and the cam surface 44 will permit the spring 42 to rotate the load pawl 29 slightly in a clockwise direction, as viewed in FIG. 8, so that the load pawl 29 will engage the teeth 39 of the adjusting nut 31 as shown in FIG. 8, and hence, the adjusting nut 31 will be prevented from rotation in the counterclockwise direction as viewed in FIG. 8. At this point, the lever 6 is being urged away from the lever 2 by the car braking piston and if the nut 31 were not prevented from rotating, the slack adjuster 1 would lengthen, longitudinal movement of the pull rod assembly 19 with respect to the housing 4 being permitted with rotation of the nut 31 caused by the force applied to internal threads of the nut 31 by the threads on the threaded portion 21. Thus, the pawl 29 must withstand the force applied thereto by the nut 31 when the car brakes are applied to the extent required to cause the load pawl 29 to engage the teeth 39, and as the car brakes are further applied, the force on the load pawl increases. However, when the load pawl 29 engages the teeth 39, thereby stopping the rotation of the nut 31, the nut 31 is pulled to the left, as viewed in FIGS. 1, 5 and 6, by the pull rod portion 21, thereby compressing the washers 37 and causing the nut 31 to assume the position shown in FIG. 6 in which the surface 38 engages the surface 34.

In such position of the nut 31, the friction between the surfaces 34 and 38 resists any further rotation of the nut 31 even if it were somehow permitted by the pawl 29. Looked at in another way, the surfaces 34 and 38 are part of a braking device for the nut 31 which supplant or, if desired, merely assist, the pawl 29 in preventing rotation of the nut 31. As mentioned previously, the properties and areas of the surfaces 34 and 38 preferably are selected so that they will prevent rotation of the nut 31 even if the pawl 29 were to become disengaged from the teeth 39 or fail.

Of course, when the surfaces 34 and 38 engage, there is also a rigid connection between the levers 2 and 6, the connection extending from the clevis 5, through the pull rod portions 20 and 21, the nut 31, the surfaces 34 and 38, the sleeve 33, the housing 4 and its end 3 to the lever 2.

When the brakes are released the cycle of operations described above is repeated in reverse order to that described and the parts return to their original positions, that is, the surfaces 34 and 38 separate, the load pawl 29 becomes disengaged from the teeth 39 of the adjusting nut 31 and the holding pawl 30 becomes engaged with the teeth 39 of the adjusting nut 31.

Similarly, if there is insufficient slack, such as, for example, when worn brake shoes are replaced, the slack adjusting device 1 will lengthen when sufficient force is applied thereto because the activating arm 7 will not be moved from the brakes released position thereof. Accordingly, the adjusting nut 31 will be free to rotate, because the holding pawl 30 rides over the teeth 39, and the pull rod assembly 19 will move to the left, as viewed in FIG. 1, with respect to the housing 4 thereby lengthening the adjusting device 1 until the load pawl 29 engages the teeth 39 by reason of movement of the activating arm 7.

It will be apparent, therefore, that the slack adjusting device of the invention operates and functions in the manner described in said Pat. No. 3,283,861, but, in addition, has a braking device for the adjusting part or nut 31 which reinforces the action of the adjusting nut stopping means or load pawl 29, and thereby, not only reduces the forces which the load pawl 29 and the ratchet teeth 39 on the adjusting nut 31 must withstand, but also, if desired, prevents rotation of the adjusting nut 31 in the event of failure of the load pawl 29 or ratchet teeth 39 under abnormal conditions. By suitably selecting the properties of the braking device, such as the dimensions, angle and coefficients of friction of the braking surfaces 34 and 38, and the force applied by the washers 37 to separate the braking surfaces, the forces applied to the load pawl 29 and the ratchet teeth 39 may range from those required merely to initially stop the rotation of the adjusting nut 31, which are relatively small, to, preferably, 50 percent of those normally encountered when the braking device is omitted, the braking device, in the latter case, providing at least 50 percent of the force required to stop rotation of the adjusting nut 31 with normal car braking forces and assuring that the adjusting nut will not rotate with higher than normal car braking forces.

It will be understood that various changes in the details, material and arrangements of parts which have been herein described and illustrated in order to explain the nature of the invention, may be made by those skilled in the art within the principles and scope of the invention as expressed in the appended claims.

What is claimed is:

1. In a slack adjusting device comprising a pull rod having a threaded portion, a housing and adjusting nut interconnecting said pull rod and said housing and having threads engaging said threaded portion, relative rotation between said nut and said rod being produced upon the application of a force to said rod directed longitudinally thereof thereby permitting relative movement of said rod and said housing longitudinally with respect to each other, and arresting means for arresting said relative rotation but permitting a predetermined amount of longitudinal relative movement of said rod and said housing when said relative rotation is arrested, the combination therewith of braking means in addition to said arresting means and actuated by at least one of said rod, said housing and said nut upon occurrence of said predetermined amount of relative movement for opposing said relative rotation between said rod and said nut, the force applied by said braking means to oppose said relative rotation being at least equal to 50 percent of the force required to prevent said relative rotation in the absence of said arresting means.

2. A slack adjusting device as set forth in claim 1, wherein said nut has a conical surface thereon which is movable in the direction of movement of said rod when said relative rotation is arrested and wherein said braking means comprises means secured to said housing and having a conical surface normally spaced from said conical surface on said nut but engageable and mating with said conical surface on said nut upon occurrence of said predetermined amount of relative movement.

3. A slack adjusting device as set forth in claim 2, wherein said force applied to said nut is at least equal to the force required to prevent said relative rotation in the absence of said arresting means.

4. A slack adjusting device as set forth in claim 3, further comprising spring means acting between said housing and said nut and urging said conical surface of said nut away from said conical surface of said means secured to said housing.

5. A slack adjusting device as set forth in claim 1, wherein said nut is rotatably mounted on said housing and is axially movable in a predetermined direction with respect to said housing by said predetermined amount of longitudinal relative movement, said nut is internally threaded, has ratchet teeth exteriorly thereof and has a circumferentially extending surface thereon facing in said predetermined direction, wherein said arresting means comprises a pawl on said housing engageable with said ratchet teeth and trigger means for causing said pawl to engage said ratchet teeth and arrest rotation of said nut with respect to said housing upon actuation of said trigger means and wherein said braking means comprises means non-rotatably secured to said housing and having a surface which complements said surface on said nut and which is normally spaced from the latter but is engageable therewith upon movement of said nut in said predetermined direction by said predetermined amount.

6. A slack adjusting device as set forth in claim 5, further comprising spring means acting between said housing and said nut and urging said surface on said nut away from said surface on said means non-rotatably secured to said housing.

7. A slack adjusting device as set forth in claim 6, wherein said surface on said nut and said surface on said means non-rotatably secured to said housing have the shape of truncated cones.

8. A slack adjusting device comprising a housing, an internally threaded adjusting nut rotatably mounted on said housing and movable axially in a predetermined direction by a predetermined amount with respect to said housing, said nut having a circumferentially extending, conical surface facing in said predetermined direction and having radially extending ratchet teeth on the periphery thereof, a pull rod having a threaded portion co-axial with said nut and engaging the threads of said nut, said nut being rotatable by said rod upon the application of a force thereto directed axially of said rod and thereby permitting movement of said rod with respect to said housing, a pawl mounted on said housing and engageable with said ratchet teeth, trigger means for controlling the position of said pawl and causing the latter to engage said ratchet teeth and arrest rotation of said nut upon actuation of said trigger means and upon movement of said rod in said predetermined direction, friction means mounted on said housing and having a conical surface complementary to the conical surface on said nut disposed in said predetermined direction with respect to said conical surface on said nut, the latter conical surface being engageable with the conical surface on said friction means upon movement of said nut in said predetermined direction by said predetermined amount, and spring means acting between said housing and said nut to urge said nut in a direction opposite to said predetermined direction whereby said nut is free to rotate with axial movement of said rod in said predetermined direction until said pawl engages said ratchet teeth and thereafter, with movement of said rod in said predetermined direction, said nut is moved by said rod in said predetermined direction causing said conical surface on said nut to engage said conical surface on said friction means and, by the friction therebetween, oppose rotation of said nut, the force applied to said nut by the friction between the conical surfaces to oppose rotation of said nut being at least equal to 50% of the force required to prevent rotation of said nut in the absence of engagement of said pawl with said ratchet teeth and with said nut in the position in which the conical surfaces are engaged.

9. A slack adjusting device as set forth in claim 8, wherein said force applied to said nut by the conical surfaces is at least equal to the force required to prevent rotation of said nut in the absence of engagement of said pawl with said ratchet teeth and with said nut in said position.

10. A slack adjusting device as set forth in claim 8, further comprising a further pawl mounted on said housing and engageable with said ratchet teeth to prevent rotation of said nut in a direction opposite to that which it is rotated by movement of said rod in said predetermined direction, said trigger means controlling the position of said further pawl and causing it to engage said ratchet teeth when said trigger means is in its unactuated position.

* * * * *